UNITED STATES PATENT OFFICE.

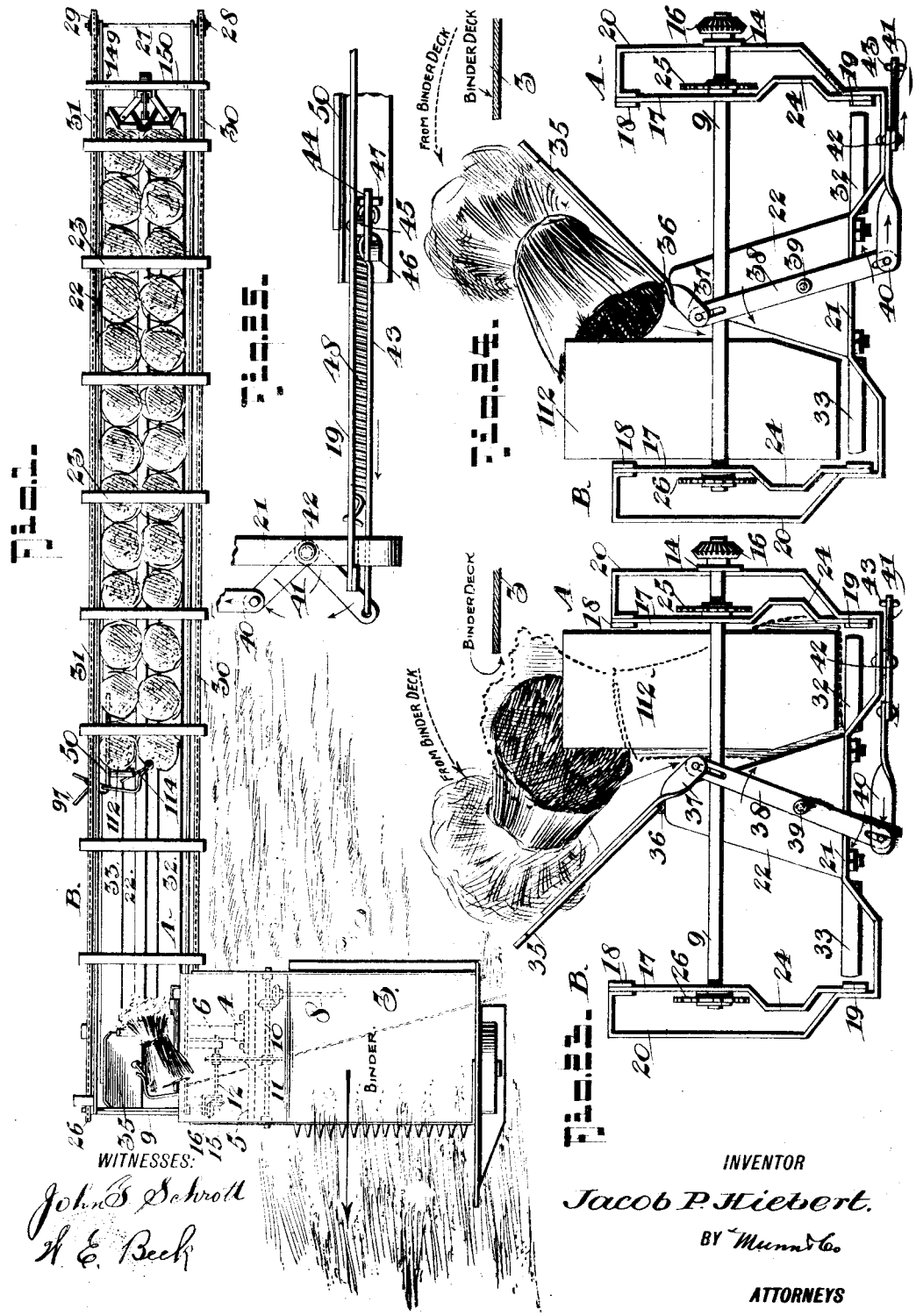

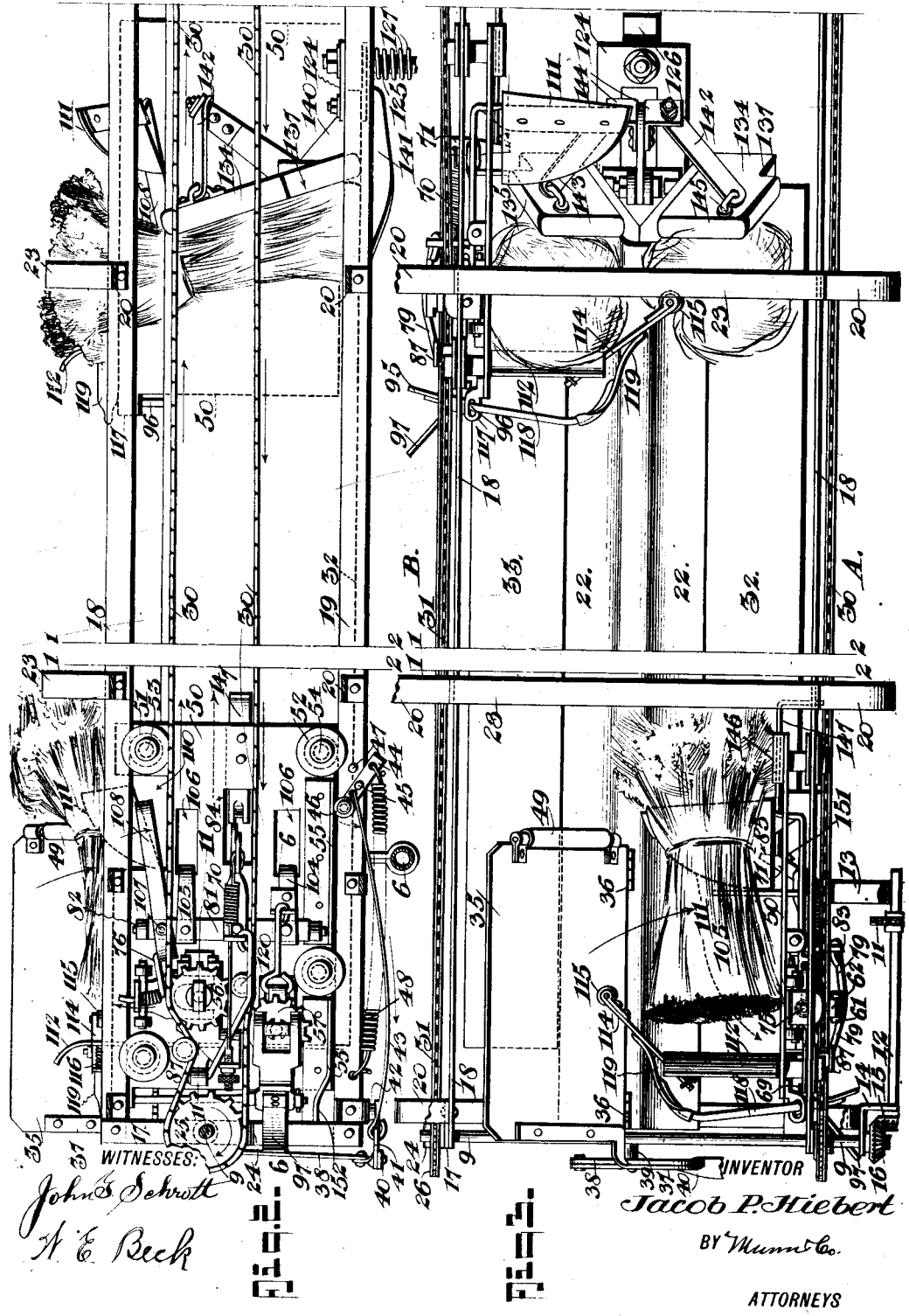

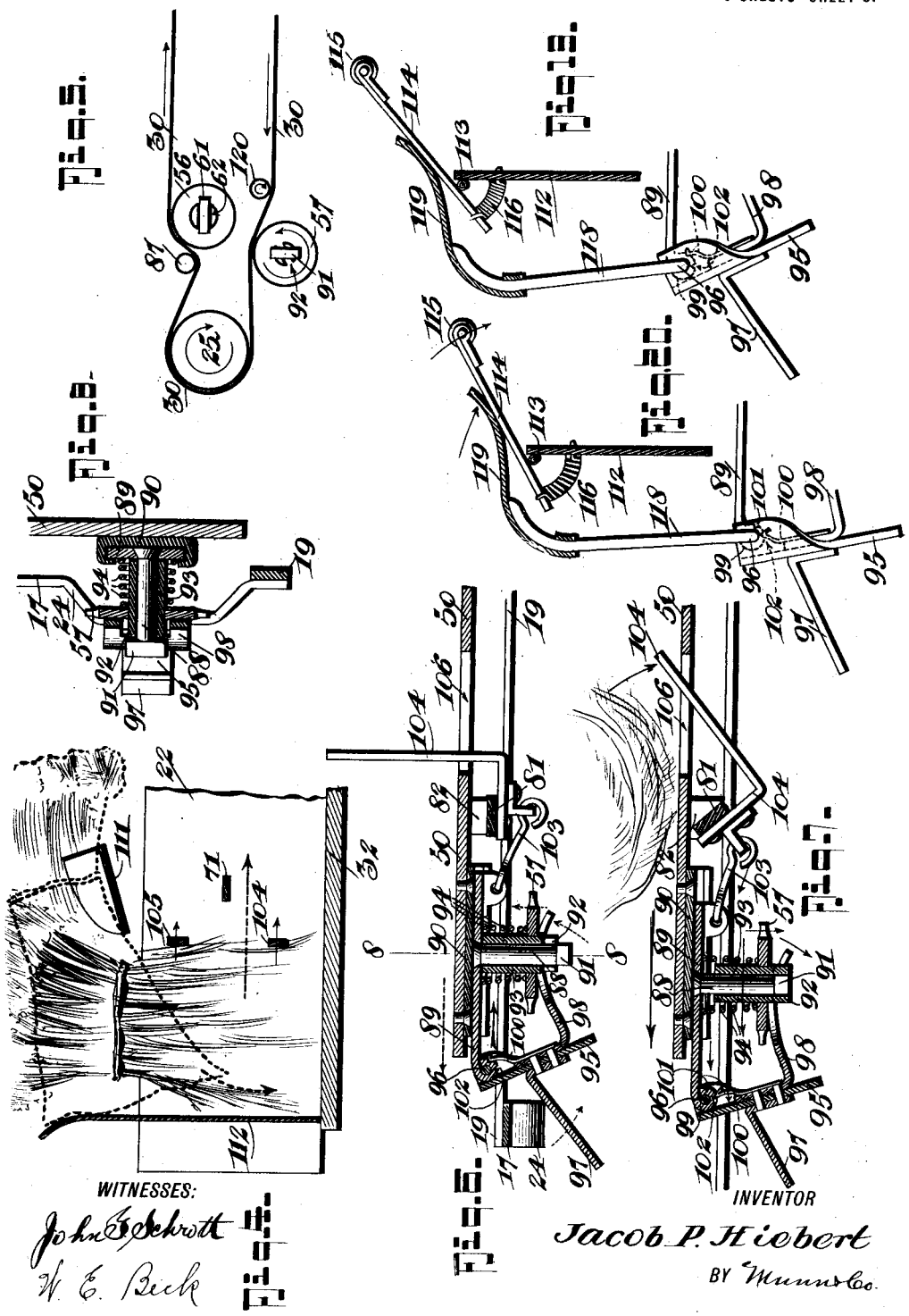

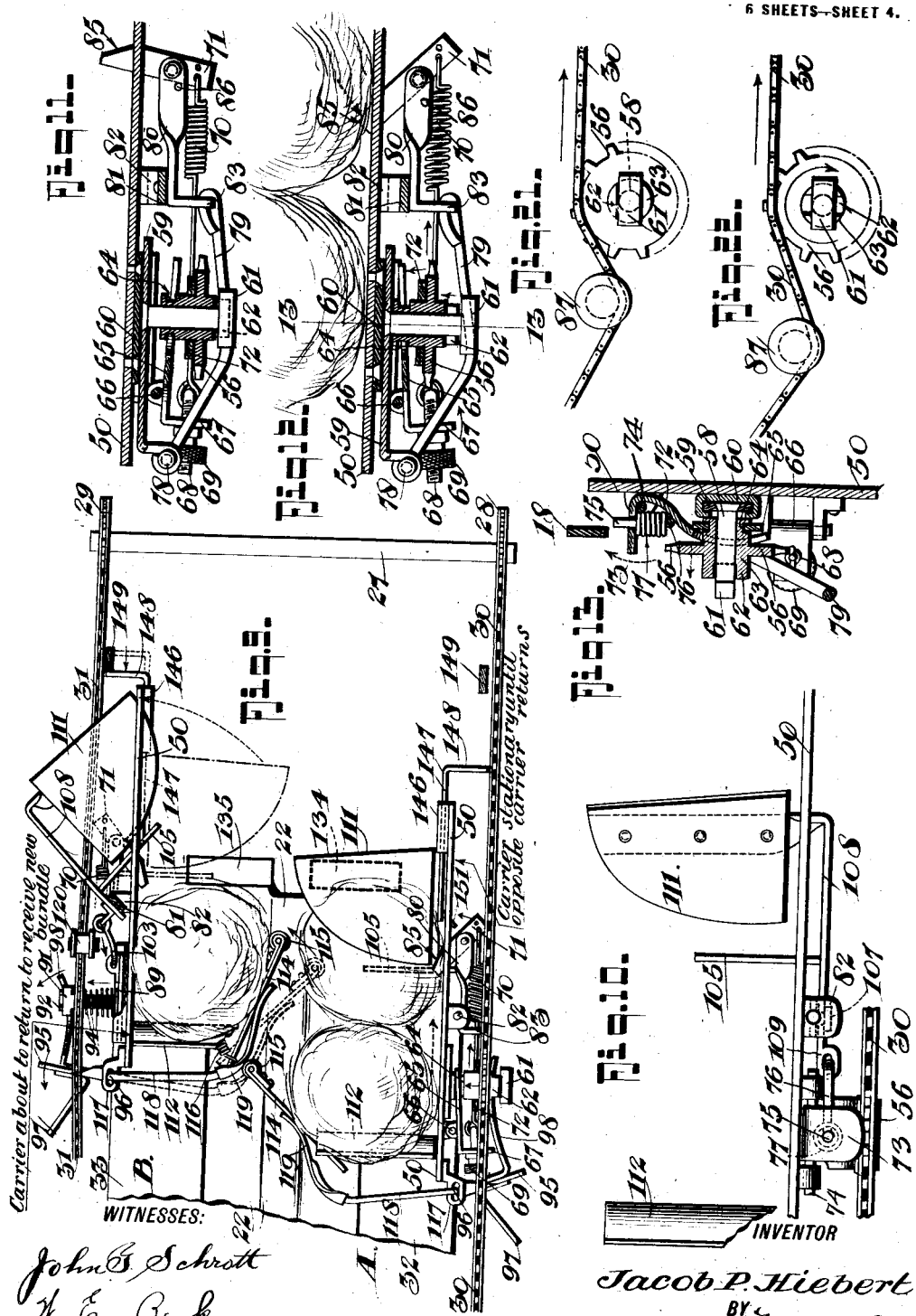

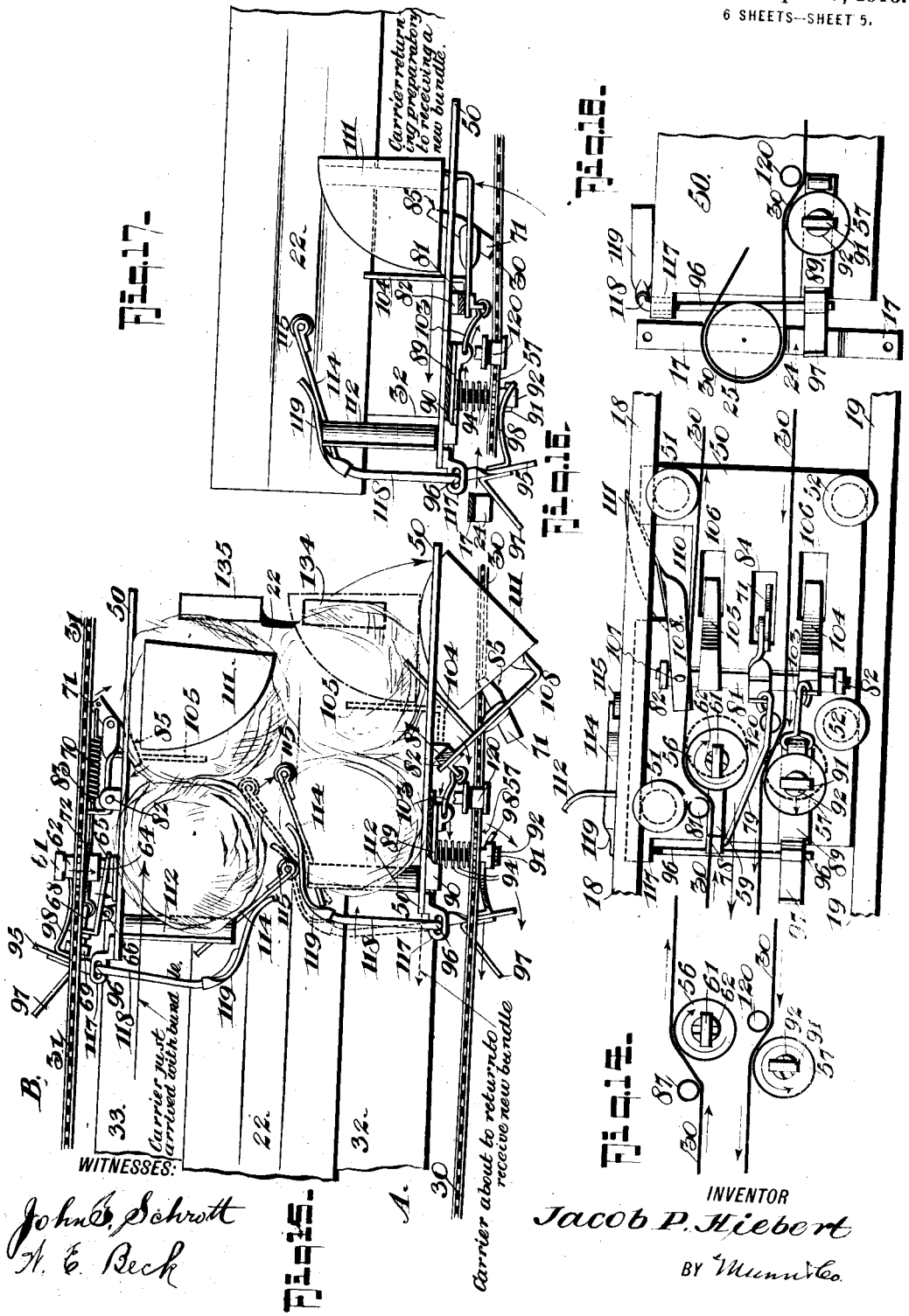

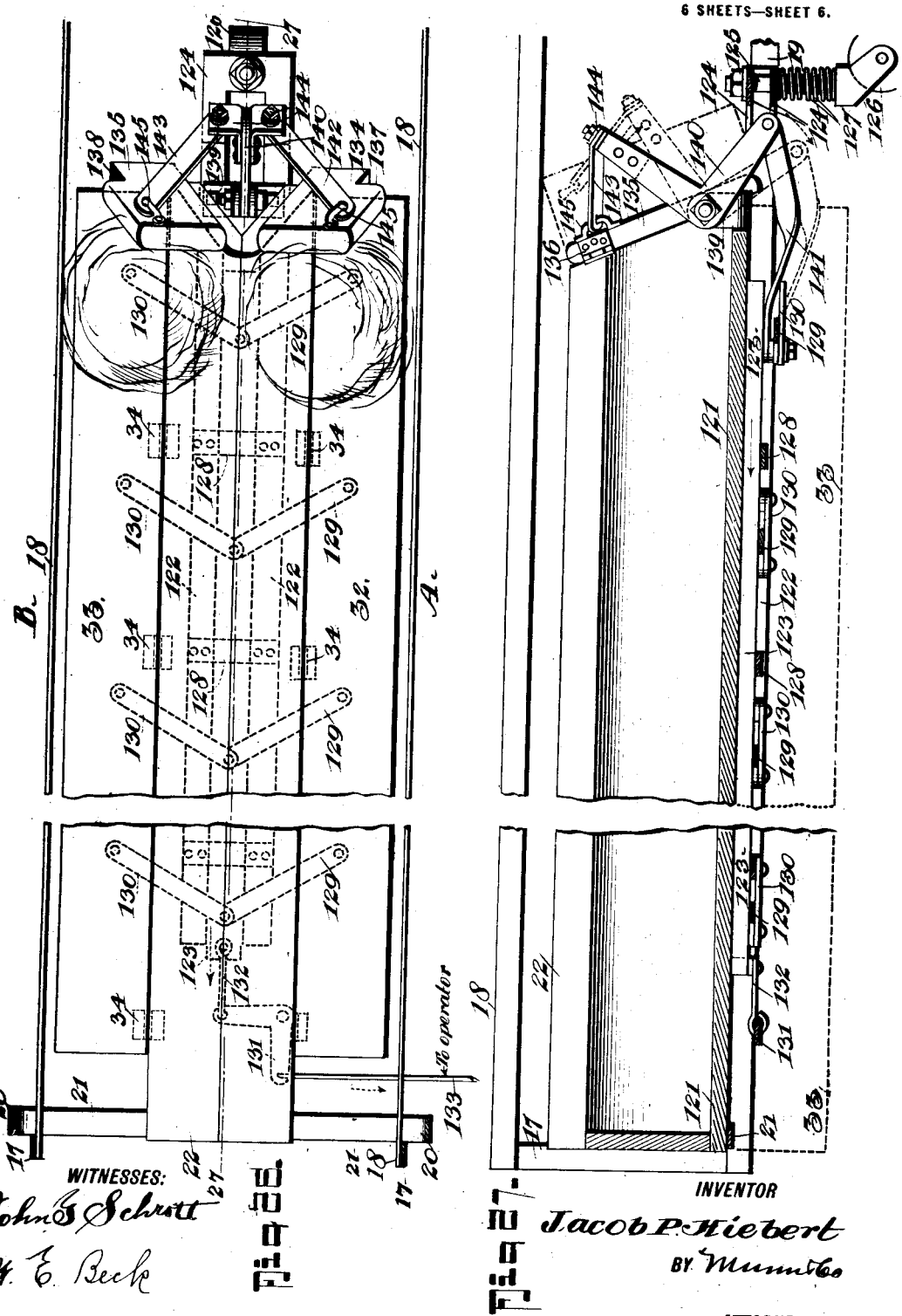

JACOB P. HIEBERT, OF HILLSBORO, KANSAS

GRAIN-SHEAF SHOCKER.

1,180,038.  Specification of Letters Patent.  Patented Apr. 18, 1916.

Application filed September 17, 1915. Serial No. 51,148.

*To all whom it may concern:*

Be it known that I, JACOB P. HIEBERT, a citizen of the United States, residing at Hillsboro, in the county of Marion and State of Kansas, have invented a new and useful Improvement in Grain-Sheaf Shockers, of which the following is a specification.

This invention relates to devices for shocking sheaves of grain and consists in the combination and operation of parts hereinafter specifically described and claimed.

The principal object of the invention is to provide a device which may be attached to a grain mowing and binding machine so as to travel therewith, and to receive the sheaves of bound grain as they are discharged by the binder. Carriers are incorporated in the device which carry the sheaves of grain rearwardly, and deposit them closely together thus forming the shock. The carriers are operated from the driving mechanism of the mowing and binding machine.

Another object is to provide duplicate sheaf carriers which are disposed on either side of a central partition. The carriers operate alternately, *i. e.*, when one carrier has delivered a sheaf to the shock, it becomes stationary and holds the sheaves on both sides of the partition from falling, while the other carrier travels to the place of sheaf discharge of the binder to receive another sheaf.

Another object is the formation of the central partition in an upwardly converging shape so that the sheaves on either row must lean toward the center. The shock is dumped on to the field in this position, and is prevented from falling over by this positioning of the bundles of grain.

Another object is the provision of a deflector gate adjacent to the sheaf discharge of the binder. This gate directs the sheaf to that side of the central partition on which a carrier has arrived to receive the sheaf.

Another object is the embodiment of novel mechanism in each carrier by means of which the individual carrier is automatically given its motion as at the front of the device when a sheaf of grain is thrown into it, and is stopped, when the same sheaf is delivered to the shock at the rear of the device.

Another object lies in the construction of the dumping mechanism which is manually operable when the shock is completely formed.

With other objects in view which shall hereinafter appear, the invention is fully described, specifically pointed out in the appended claims, and illustrated in the accompanying drawings in which:—

Figure 1 is a plan view of the device showing it applied to a mower and binder. Fig. 2 is a side elevation thereof, it being intended that lines 1—1 and 2—2 be read as one. Fig. 3 is a plan view, it being intended that lines 1—1 and 2—2 be read as one. Fig. 4 is a detail sectional view illustrating the effect of the falling sheaf, on the parts of the sheaf carrier. Fig. 5 is a diagrammatic view showing the chain connection with the carrier and frame sprockets. Fig. 6 is a section on line 6—6 on Fig. 2. Fig. 7 is a similar section showing another adjustment of the parts. Fig. 8 is a section on line 8—8 on Fig. 6. Fig. 9 is a plan view of the rear end of the sheaf shocking device, and showing the lower sheaf carrier as having just come to rest against the shock while the upper carrier is about to move forwardly. Fig. 10 is a detail plan view of the sheaf catcher. Fig. 11 is a section on line 11—11 on Fig. 2. Fig. 12 is a similar view showing a different position of the parts. Fig. 13 is a section on line 13—13 on Fig. 12. Fig. 14 is a diagrammatic view showing the position of the carrier sprockets when the carrier is in the position shown in Fig. 9. Fig. 15 is a plan view showing the upper carrier as just having come to rest while the lower carrier is about to move forwardly. Fig. 16 is a side elevation showing the position of the parts of the lower carrier when they are as in Fig. 15. Fig. 17 is a plan view of the lower carrier and showing it as has reached the front of the frame. Fig. 18 is a diagrammatic view illustrating the position of the parts when they are as in Fig. 17. Figs. 19 and 20 are detail sectional views of the carrier trip hereinafter referred to. Figs. 21 and 22 are detail views of one of the carrier clutch devices hereinafter described. Figs. 23, 24 and 25 are views of the sheaf deflector gate and the co-acting mechanism. Fig. 26 is a plan view showing more particularly the dumping mechanism. Fig. 27 is a section on line 27—27 on Fig. 26.

Attention is now directed to Fig. 1 in which the shock forming device is shown attached to a binder so as to move with it as the binder travels over the field. A rigid connection between the two is obtained by bolting a collar "4" on to a fixed bar 5 of the binder. A heavy pipe 6 is screwed into the collar 4 and extends over to the shocker frame to which it is suitably secured.

The fixed relationship of the shocker frame with the binder may be maintained by suitable braces, not shown, it being understood that the connection 6 may be unfastened from the shocker frame when it is desired to separate the two mechanisms.

Motion, for the operation of the shocking mechanism is derived from a shaft 8 of the binder 3 and is transmitted to the main driving shaft 9 of the shocker, through the cross shaft 10, chain and sprocket connection 11 and cross shaft 12.

The shaft 12 is a part of the shocker mechanism and is mounted in bearings 13 and 14 on the shocker frame. The bearing 14 also supports one end of the drive shaft 9 as shown in Fig. 3. The shaft 9 is driven from the shaft 12 by miter gears 15 and 16. The shaft 9 also has bearing in the vertical end spacers 17 of the shocker frame which comprises the horizontal upper and lower rails 18 and 19. The rails 18 and 19 which are the tracks on which the bundle carriers travel as will hereinafter be set out, are supported in parallelism by other vertical spacers 20. The end spacer 20 on which the bearing bracket 24 is mounted (see Figs. 3 and 23) is a continuous metal strip which extends under the shocker as at 21, and is then formed into the spacer 20 for the rails 18 and 19 on the opposite side. The part 21 of the end spacer 20 just referred to is secured to a centrally disposed wooden or metallic partition 22, by bolts (see Fig. 23) and thus establishes the distance at which the rails 18 and 19 at either side are held from the partition. This distance is evenly maintained throughout the length of the shocker by horizontal spacers 23 which are riveted with the vertical spacers 20, to the upper rails 18 at each side. The spacers 17 are bent outwardly as at 24 to form abutments for a certain trip device carried by the sheath carriers, the abutments 24 being formed at a place where they will not interfere with the sprocket wheels 25 and 26 on the drive shaft 9 as shown in Fig. 23.

Mounted in suitable bearings in the framing of the shocker and at the rear or opposite end of the device, is a shaft 27, similar to the drive shaft 9, the shaft 27 having sprockets 28 and 29 on its ends. A carrier chain 30 passes over the sprocket 25 on the shaft 9 and sprocket 28 on shaft 27, and a similar carrier chain 31 passes over the sprocket 26 on shaft 9 and sprocket 29 on shaft 27. The chains 30 and 31 are in constant motion while the shocker is in operation, but a clutch (not shown) may be introduced in the shaft 12 to disconnect the driving mechanism of the shocker from that of the binder 3. The partition 22 which is preferably constructed of wood and of sheet metal, is formed with sloping or upwardly converging sides, so as to cause the sheaves of grain as they are formed into the shock, to lean toward the center of the partition.

In order to support the sheaves of grain in position against the sides of the partition 22 while the shock is being formed, bottom gates 32 and 33 are hinged to the partition 22 by hinges 34 as shown in Fig. 26. The hinged bottom gates 32 and 33 are normally held in a horizontal position (see Figs. 2, 3, 23 and 26). Suitable mechanism is provided to move the gates downwardly on their hinges as shown in dotted lines in Fig. 27, when the shock has been completely formed and the operator desires to dump it on to the field. This mechanism will presently be described.

By reference to Fig. 23 it will be seen that a deflector gate 35 is hinged as at 36, to the apex of the central partition 22. As will be seen in Figs. 1, 2, 3, 23 and 24 this deflector 35 is positioned adjacent to the binder deck of the binder 3 from whence the bound sheaves of grain are discharged. The deflector 35 has an extended arm 37 at one side to which is connected one end of a lever 38. The lever 38 is pivoted at 39 to the closed end of the partition 22 and the other end of the lever connects to a link 40. A bellcrank 41 is pivoted to the downwardly bent portion of the metal strip 21 (see Fig. 23). The link 40 is connected to the other arm of the crank 41. A link rod 43 extends rearwardly (see Figs. 2 and 25), and connects to a detent 44 which is pivoted to the lower rail 19 as at 45. A friction roller 46 is mounted on a stub shaft on the upper end of the detent 44, the purpose of the roller being to lessen the friction between the contacting parts when a cam plate 55 on the bundle carrier engages the roller as in Fig. 2. The detent 44 is normally held back against a stop 47 by a coil spring 48 which is hooked onto the detent 44 at its lower end and onto the bottom rail 19.

When the cam plate 55 on the carrier as shown in Fig. 2 engages the roller 46, the deflector 35 is caused to move into the position shown in Fig. 23 and when the roller 46 is again disengaged by the cam plate, then the deflector returns to the position shown in Fig. 24 since the spring 48 serves to accomplish this. The deflector 35 is assisted in quickly assuming its alternate positions, by applying a weight 49 onto one edge as in Figs. 2 and 3. The sheave carrier 50, shown in Fig. 2 is provided at suitable places with grooved rollers 51 and 52 at the top and bottom, the rollers being adapted to engage and move on the rails 18 and 19. The grooved rollers 51 and 52 are rotatably mounted on short stub shafts 53, 54 which are firmly secured to the outer face of the carrier 50. Fastened near the bottom edge of the carrier 50 is a cam plate 55, the front section of which is turned up as at 152 in (Fig. 2) to accomplish the gradual depression of the detent 44 when the roller 46 is engaged.

Disposed in certain positions on the carrier 50 are sprocket wheels 56, 57. The sprockets 56, 57 are so mounted that they may be moved in a horizontal direction at times to be hereinafter explained, and the undersides of both lengths of the chain 30 engage the teeth of the sprockets at the upper edge as shown.

In Figs. 11 and 13, it will be seen that the upper sprocket 56 is rotatably mounted on a spindle 58 which is secured on a slide 59 so that the spindle and sprocket must move when the slide 59 is moved. Slide 59 is held in a guide 60 riveted to the carrier 50, and the upper and lower edges of the guide are down and upturned to retain the slide 59 in place. The spindle 58 has an integrally formed and laterally extended head 61, the squared lateral portions of the head 61 being engaged at times by the slots 62 in the collar 63 of the sprocket 56. The head 61 and slots 62 thus form the elements of a clutch. Sprocket 56 has also a rearwardly extending collar which is circumferentially grooved as at 64 and the groove 64 receives the bifurcated end of a horizontal shifting lever 65. This lever 65 is pivoted at 66 to the slide 59 (see Figs. 11 and 12), and has a right-angled bend 67 which is centrally apertured. A screw shank 68 is loosely fitted into the apertured end 67, and is provided with a spring tension adjusting nut 69. The shank 68 is apertured at its other end to receive the looped end of a tension spring 70, the other end of which connects to a disconnector arm 71.

Pivoted at 74 in suitable bearings on the carrier 50 (see Fig. 13) is a vertical shifting lever 72, which is bifurcated at its lower end, and engages the rear face of the sprocket 56. The lever 72 has a right-angled extension 73 which is centrally apertured to admit the upturned end 75 of an arm 76 which is pivotally mounted on the end of the catcher-plate arm presently to be described. A spring 77 is coiled about the end 75 and bears against the part 73 and the arm 76. The spring 77 tends to force the arm 76 downwardly, and thus keep the catcher plate elevated in the normal positioning of the mechanism. The slide 59 is extended at right angles at one end and forms a bearing connection 78 for a connecting link 79. The disconnector 71 before mentioned, is pivotally mounted on a supporting bracket 80 which is in turn secured to a vertically positioned bar 81, the bar 81 being pivoted on the carrier 50 in bearings 82 at its upper and lower ends. The bracket 80 has an outwardly extending portion 83 to which the link 79 connects. The disconnector 71 projects through in opening 84 in the carrier 50 into the inside of the shocker, and also into the compartment occupied by the grain sheaves. This end of the disconnector is beveled as at 85 to obviate any tearing or injury to the grain stalks or binding. The movement of the disconnector 71 is limited in one direction (see Fig. 11) by a stop-pin 86, such position being normal.

At a place adjacent the sprocket 56 (see Fig. 2) is an idler pulley 87 which engages the chain 30, and insures the contact of the chain with the sprocket 56. The idler 87 is fixed in relationship to the carrier 50 whereas the sprocket 56 is relatively movable the purpose of this provision being hereinafter made apparent. The lower sprocket 57 is rotatably mounted on a spindle 88 (see Figs. 6, 7 and 8) which is secured on to a slide 89, so that when the slide is moved, the spindle and sprocket move with it. The slide 89 is held in a guide 90 which is in turn riveted to the carrier 50. The upper and lower edges of the guide are turned down and up so as to retain the slide in its place. The spindle 88 has an integrally formed and vertically extended head 91 to squared portions of which are engaged at times by the slots 92 in the end of the collar 93 of the sprocket 57. The head 91 and slots 92 form the elements of a clutch, the operation of which will hereinafter be explained. The collar 93 extends rearwardly toward the slide 89 and forms a long bearing for the sprocket 57, the sprocket and collar being securely fastened so as to turn together. A coil spring 94 which has bearing between the sprocket 57 and slide 89, tends to force the sprocket outwardly and the clutch elements 91, 92 into engagement, but this tendency of the spring is normally counteracted by the trip lever 95. The trip shank 96 of the trip lever 95 is pivotally mounted in the bearing 99 formed on an extension of the slide 89. Secured to the lever 95 at one side is a trip 97 which projects from the lever 95 in a substantially right-angled direction. Secured to the lever 95 at the inner side is a sprocket shifting lever 98 which is bifurcated at the end so as to pass the collar 93 and engage the face of the sprocket 57.

When the carrier is in the position shown in Fig. 1, then the trip 97 has engaged the abutment 24 (see Fig. 6), and moved the sprocket clutch elements 91, 92 out of engagement against the tension of the spring 94. The shifting lever 98 is held to this position (as in Fig. 6) so as to keep the clutch elements 91, 92 from engagement, by a spring-latch 100. The end of the spring-latch engages a notch 101 in the bearing 99 and holds the sprocket 57 to its position, but the latch is resilient enough to be forced out of engagement with the notch 101 under another condition to be explained later. Another notch 102 in the bearing 99 (see Fig. 7) is engaged by the spring latch 100 when the clutch elements 91, 92 have been moved into engagement. In this instance the latch 100 serves to hold the trip 97 and shifting lever 98, firmly in position.

The slide 89 is provided with a lug at the end opposite to the bearing 99, and a link rod 103 is secured thereto. The link 103 is also secured to a projection on a sheaf holding arm 104 which is in turn riveted to the vertical bar 81 (see Fig. 2). Riveted to the bar 81 at a place equi-distant from the top as the arm 104 is from the bottom of the carrier 50, is another sheaf-holding arm 105. The arms 104, 105, project through slots 106 of suitable dimensions in the carrier 50 into the compartment to be occupied by the sheaves of grain. The arms 104, 105 assume this position at certain times (see Fig. 6), and at other times are moved from this position so that the grain sheaves may be passed without interference as in Fig. 7.

Pivoted at 107 to the bar 81 immediately above the sheaf-holding arm 105, is the catcher-plate arm 108 (see Figs. 2 and 10). A boss 109 is provided on the slot in which the end of the arm 76 has loose bearing. The catcher-arm 108 is extended at right-angles at its other end through an opening 110 in the carrier 50, and into the compartment to be occupied by the sheaves of grain. Secured to this right-angled extension which is turned flatwise, is a sheaf catcher-plate 111. The sheaves of grain are thrown on to this catcher-plate as they are discharged from the binder-deck 3 (see Figs. 2, 3 and 4).

Fastened to the carrier 50 so as to move with the carrier, and located in the grain-sheaf compartment, is a follower 112. The upper edge of the follower is turned on a gradual curve so that no obstruction is offered to the stubble end of the grain stalks as the sheaf is dropped into position (see Fig. 4). The follower 112 pushes the sheaf of grain rearwardly when the carrier is moved the holding arms 104, 105 preventing the sheaf from falling over during transit.

Pivoted at 113 on the follower 112 is a sheaf-retaining detent 114, a friction roller 115, being mounted on the outer end thereof. A coil spring 116 is attached to the other end of the detent 114 and the follower 112 (see Figs. 19 and 20). When the spring 116 is contracted (Fig. 19), it forms an abutment which limits the movement of the detent in one direction. The trip-shank 96 is loosely mounted in the bearing 99 so as to permit a slight lateral movement since the slide 89' on which the bearing 99 is formed, is shifted laterally at times, and the bearing for the shank 96 must be ample enough to compensate for this movement of the slide 89. The trip-shank 96 extends vertically (Figs. 2, 16 and 18), and passes through a slot in a bearing 117 on the carrier 50 (Figs. 3, 9 and 17). The shank 96 is then bent at right-angles as at 118, and extends across the sheave compartment and is provided at its end with a broad contact-plate 119 which engages the detent 114. When the clutch elements 91, 92 are in engagement as in Fig. 7, the shank 96 has been turned away from the position of the parts shown in Fig. 6, and the contact-plate 119 (Fig. 20) has depressed the detent 114 against the tension of the spring 116. The spring-latch 100 holds the parts just mentioned in this position (Fig. 20) until the trip 97 strikes the abutment 24 (Fig. 6) after which the parts assume the position shown in Fig. 19. Both the contact-plate 119 and detent 114 lie in a plane above the top of the converging partition 22, so that the sheaves may be supported near the tops (Figs. 2, 3, 9 and 15).

At a place adjacent the sprocket 57 is an idler pulley 120 which engages the chain 30, and insures the contact of the chain with the sprocket 57 (Fig. 2). The idler has fixed relationship with the carrier 50 whereas the sprocket 57 is relatively movable, the purpose of this provision being hereinafter made apparent. The carrier 50 is provided at the rear end and in an even plane with the disconnector 71, with a guide 146 (Figs. 2, 3 and 9) in which an auxiliary disconnector arm 147 is slidably mounted. The arm 147 is turned outwardly as at 148 and extends into the plane occupied by a vertical bar 149 which depends from a horizontal cross bar 150 which is similar to the cross bars 23 (Fig. 1). The arm 147 has an outwardly turned lip 151 which is adapted to strike the disconnector 71 (Fig. 9) at certain times to be hereinafter explained. The carrier 50 is duplicated on the other side of the partition 22, and the two carriers are identical in structure and in the operation of the mechanism. For facility in distinguishing the two carriers 50, one side is designated "A" and the other "B." The operation of the two carrier mechanisms is not synchronal, but alternate and will be fully explained in the operation of the device.

As hereinbefore stated, the sheaves of grain are supported in the sheave compartments by the resting of the stubble ends on the bottom gates 32, 33 (Figs. 26 and 27). Secured to the bottom 121 of the converging partition 22 are guide bars 122 between which a slide 123 operates. The guides 122 extend rearwardly and beyond the gates 32, 33 (Fig. 26), and are bridged by metal plates 124. The shank 125 of a caster 126 is supported in the bridge-plates 124, and a coil spring 127 is coiled about the shank 125 and bears against the lower one of the plates and the caster-roller frame. The spring 127 acts as a shock-absorber, as the machine travels over the field. The slide 123 is held in place between the guides 122, by cross-bars 128. Pivoted to the slide 123 and to the gates 32, 33 are links 129, 130. Pivoted to the bottom 121 of the central partition (Fig. 26) is a bell-crank 131, one arm of which is joined through a link 132 with the slide 123, while the other arm of the bell-crank is apertured to receive a rod 133 which leads to convenient reach of the binder operator. When the links 130 are positioned as in Fig. 26, the gates 32, 33 are in the horizontal or closed position, and the grain sheaves are held in place. When the rod 133 is pulled and the slide 123 carried forwardly (see arrows Fig. 26), then the links 130 will move the gates on their hinges 34 in a downward direction to the position shown in dotted lines in Fig. 27, and thus dump the completed shock of grain sheaves onto the field. The shock is formed against the rear end-gates 134, 135 which are positioned on an inwardly inclined angle (Fig. 27). The gates 134, 135 are hinged at 136 to the central partition 22, and have cut-out portions 137, 138 which permit the passage of the lower sheaf-holding arm 104 when either carrier 50 makes its initial transit. Pivoted in a bracket 139 centrally disposed between the gates 134, 135 is a bell-crank 140. A link 141 is pivoted to the bottom arm of the bell-crank, and extends rearwardly and under the bottom 121 of the central partition 22, and connects to the slide 123. Links 142, 143 are pivoted to brackets 144 on the end of the upper arm of the bell-crank, and the links extend toward the gates 134, 135 to which they are in turn pivoted through staples 145. When the slide 123 is moved as previously described, to dump the shock, the link 141 is carried with the slide 123, and moves the bell-crank 140 to the position shown in dotted lines in Fig. 27. This movement also opens the gates 134, 135 to the position shown in dotted lines in the same figure.

From the foregoing description the construction of the device will be readily understood, the operation being as follows: Since the mechanism of the sheave carriers 50 on each side, is identical in construction, the operation of the various parts when referred to will be distinguished in the following description only by adding the letters (A) and (B) which are an index to the side on which the particular mechanism referred to, is on; e. g., 50 (A) is the carrier on side A; 111 (B) is the catcher plate on side B, and etc. The sheave carriers 50 are normally positioned diagonally opposite each other (Fig. 3). The sheave carriers also operate at alternate times; i. e., the carrier 50 (A) (Fig. 3) is about to be set in motion to carry the sheaf, which is being thrown thereon, back to the shock in formation. The carrier 50 (B) is stationary during the above performance, and is holding the shocks on sides A and B, in position. This carrier remains so until the carrier 50 (A) reaches the shock, whereupon it sets the carrier 50 (B) into operation. The carrier 50 (B) returns to the front to receive a new sheaf while the carrier 50 (A) having become stationary in its turn, holds the shock in position. The carrier 50 (A) has reached the front of the device to receive a new sheaf (Figs. 2, 3, 4 and 23). Prior to reaching this position and while this carrier 50 (A) is in transit, the adjustment of the lower sprocket 57 and its co-acting parts is as in Fig. 7. The clutch elements 91, 92, in this adjustment are in engagement and are held thus, by the spring 94. Since the sprocket 57 and collar 93 of the clutch element 92 are fixedly united, the sprocket 57 can not rotate on its supporting spindle 88, and becomes a fixture with relationship to the chain 30 which passes over it. Since the chain is held in contact with the teeth of the sprocket 57, the entire carrier 50 (A) must move forwardly in the direction of the lower part of the chain 30 (see arrow Fig. 2), and thus be placed in position for receiving a new sheaf. The trip 97 (Fig. 7) is held in this position by means of the contact of the spring-latch 100 with the notch 102 of the bearing 99. When the carrier 50 (A) reaches a predetermined position at the front of the device, the trip 97 will strike the abutment 24 on the spacer 17 (Fig. 6) and move the trip 97 on its pivot in the direction of the arrow, and force the clutch elements 91, 92 out of engagement. The sprocket 57 is thus moved inwardly by the shifting lever 98 (see arrows), and is again free to rotate on its spindle 88.

The clutch elements of the upper and lower sprockets 56 and 57 are now out of engagement, and the carrier 50 (A) comes to rest. As the carrier 50 (A) about reaches this place of rest, the upturned section 152 of the cam-plate 55 strikes the roller 46 of the detent 44 and moves it downwardly (see arrow, Fig. 2). This movement projects the rod 43 forwardly (see arrow Fig. 25) rotates the bell-crank 41 on its pivot and moves the link 40 (Fig. 23) over. This movement of the link 40 rocks the arm 38 on its pivot 39 in the direction of the arrows, and in turn rocks the deflector gate 35 on its hinges 36, and uncovers the path of the grain sheaf to the compartment on side A. Now as a sheaf of grain is discharged from the binder deck 3 (Fig. 23), it falls on to the catcher-plate 111 of the waiting carrier 50 (A). The weight of the sheaf forces the catcher-plate 111 (Fig. 2) downwardly and the arm 76 upwardly against the tension of the interposed spring 77 (Fig. 13) which acts as a buffer. The lever 72 is now rocked on its pivot 74 (see arrow Fig. 13) and the sprocket 56 is forced outwardly. When the clutch elements 61, 62 come into engagement (Fig. 11), the sprocket 56 is brought to rest as in Fig. 21 from the freely rotating position in Fig. 22. The clutch elements of the upper sprocket 56 are now in engagement while the clutch elements of the lower sprocket 57 are still out of engagement. The upper sprocket is therefore fixed in relationship to the upper part of the chain 30, while the lower sprocket is relatively movable to the lower part of the chain. Since the upper sprocket 56 is fixed to the upper part of the chain 30, the carrier 50 (A) to which the sprocket is joined, is moved rearwardly to deposit the sheaf just received against the other sheaves of the shock in formation. The carrier 50 (A) is now in the position shown in Fig. 9. As before stated, the parts of the carrier 50 (A) during forward transit were positioned as in Fig. 7 with the shock holding arms 104, 105 retracted in the openings 106 in the carrier 50 (A). At the time that the slide 89 was in its forward position in the guide 90 (Fig. 7), the sprocket 57 therefore was also in the forward position and distanced away from its co-acting idler 120, while the upper sprocket 56 was jammed to its co-acting idler 87. The carrier 50 (A) made its forward transit with the two sprockets in these positions. As soon as the trip 97 (Fig. 6) came into contact with the abutment 24 on spacer 17, the first action was to move the slide 89 rearwardly (see full arrow) since the spring-clutch 100 is of sufficient strength to hold the trip 97 in position during the accomplishment of this primary operation. The continued pressure against the abutment 24 is what shifted the lever 98 and disengaged the clutch elements 91, 92. The slide in being moved rearwardly (as above), also moved the link 103 and turned the bar 81 on its pivots to set the arms 104, 105 back into the sheaf compartment (Fig. 6). This action frees the sprocket 56 from its jammed relationship with the idler 87 and jams the lower sprocket 57 against its idler 120. This exact position is shown in Fig. 2. After the new sheaf of grain has struck the catcher-plate 111 (Fig. 2) it falls from there (dotted lines Fig. 4) onto its stubble ends into the chamber formed by the follower 112 and the previously set arms 104, 105. As the sheaf falls, it is crowded between the follower 112 and arms 104, 105, and forces the latter outwardly (see arrows Fig. 4). This movement jams the upper sprocket 56 against its idler 87, and frees the lower sprocket 57 from its idler 120 (Fig. 5). The rearward transit of the carrier 50 (A) is made with the sprockets in this position and the sprockets remain so until the position in Fig. 9 is reached. During the forward transit of the carrier 50 (A) the parts were positioned as in Fig. 7. The trip-shank 96 on which the trip 97 is indirectly secured, was turned to the position shown in Fig. 20. The contact-plate 119 on the arm 118 of the trip-shank had depressed the detent 114 against the tension of the spring 116. When the trip 97 struck the abutment 24 (Fig. 6), the trip-shank 96 was turned and thereupon the latch-spring 100 became engaged with the notch 101 in the bearing 99 and was held thus. This action had moved the contact-plate 119 away from the detent 114 and had permitted the detent 114 to become extended across the ridge of the partition 22 and over the compartment on side B (Figs. 3, 9 and 19). The rearward transit of the carrier 50 (A) was made with the detent 114 in this position. The carrier 50 (B) (Fig. 9) made its initial transit under the same conditions as just described for carrier 50 (A) and when it reaches its rearmost position, the detent 114 on carrier 50 (B) was also extended across the ridge of the partition 22, and served to hold a previously placed sheaf in compartment A, in place. This position of the detent 114 (B) is shown in dotted lines in Fig. 9. As the carrier 50 (A) reaches the rearward position with its carried sheaf, the disconnector 71 will engage the sheaf previously placed and turn the disconnector on its pivot (see Fig. 12). This action causes a pull to be exerted on the spring 70. This in turn pulls on the end 67 of the throw-out lever 65, the bifurcated end of which engages the groove 64 in the collar 63 of the upper sprocket 56. This end of the lever 65 therefore moves inwardly (see arrow, Fig. 12), and disconnects the clutch elements 61, 62. The sprocket 56 is now no longer bound to the upper part of the chain 30 and can rotate freely on its spindle 58. The carrier 50 (A) is now at rest, and the new sheaf is in its final position in the shock.

While the disconnector 71 was performing its function (as above), the partly retracted sheave-holding arms 104, 105 came into contact with the sheaf previously delivered. The arms were thereby returned, by reason of this contact, to their extended positions (see dotted position, Fig. 9). This action releases the upper sprocket 56 from its jammed relationship with the idler 87, and serves to jam the lower sprocket 57 against its idler 120. These parts remain so until they are again released at a predetermined time. On reaching the position in Fig. 9, the detent 114 on carrier 50 (A) engages the rounded surface of the contact-plate 119

(B). Since the rear end of the detent 114 (A) rests against the fully contracted spring 116, the detent 114 (A) becomes a solid abutment which displaces the detent 114 (B) from the dotted line position to that shown in full lines in Fig. 9. This detent 114 (B) which formerly held the first sheaf on side A in place, is now withdrawn from contact with the sheaf since it is not needed. The newly delivered sheaf on side A and the now stationary carrier 50 does this. The action of displacing the detent 114 (B), rotates the trip shank 96 (B) (see arrow, Fig. 9), and in turn moves the shifting lever 98 (B) away from the lower sprocket 57 (B). The spring 94 (B) now pushes the sprocket 57 (B) outwardly (see arrow), and the clutch elements 91 (B), 92 (B) become engaged, consequently locking the lower part of the chain 31 (side B) with the sprocket, and the carrier 50 (B) begins to make its transit forwardly to receive a new sheaf. The carrier 50 (A) has packed the two sheaves on side A tightly and the detent 114 reaches across the ridge of the partition 22 and holds the sheaf on side B from falling over. The operation of bringing the carrier 50 (B) into action, also embodies the combined function of moving the arms 104 (B), 105 (B), disconnector 71 (B) and catcher-plate 111 (B) nearly out of the sheaf compartment (see full-line position, Fig. 9). If no such provision were made, the sheaf in that carrier would again be transported forwardly instead of being left at the forming shock. This operation will presently be explained. The carrier 50 on side B now travels to the front of the device and receives a new sheaf. At that time when the carrier 50 on side A, departed toward the rear of the device with the sheaf hereinbefore mentioned, the pressure of the cam-plate 55 on the detent 44 was relieved and the detent returned to its normal position against the stop 47. This was done by the contraction of the spring 48. The rod 43 was therefore pulled rearwardly, and the bell-crank 41 was in turn rotated on its pivot 42. The link 40 moved the lever 38 over (see Fig. 24) which in turn adjusted the deflector gate 35 so that the next sheaf would be thrown into the waiting carrier 50 (B) which by this time is supposed to have taken its position. The carrier 50 (B) having received the sheaf, travels rearwardly, the parts being then positioned as shown in Fig. 15, the manner of operating the catching, starting and stopping mechanisms being identical with that set forth in the description of carrier 50 (A). It has been stated that the detent 114 (A) was in an extended position. Now when the carrier 50 (B) reaches the rear of the device (Fig. 15) the detent 114 (B) thereon strikes the contact-plate 119 on carrier 50 (A), and moves it from the dotted line position to that shown in full lines. The trip-shank 96 (A) is thereby rotated, (see arrows) the shifting lever 98 is moved outwardly (see arrows), and the clutch elements 91, 92 are forced into engagement by the exertion of the spring 94. The sprocket 57 is again locked to the chain 30, and the carrier 50 (A) is about ready to return.

It should be recalled that the lower sprocket 57 is jammed against the idler 120, and the upper sprocket 56 is free (Fig. 14). Now as soon as the clutch elements 91, 92 (carrier A) engage one another the jolt of the sudden start will be great enough to instantly displace the lower sprocket from its jammed relationship with the idler 120 shown in dotted lines Fig. 16, to the position in full lines, when it will be free. This sudden motion did therefore carry the sprocket 57, and its attendant slide 89, forward (Fig. 16) pulled on the link 103, rotated the bar 81 on its pivot, and in turn retracted the arms 104, 105 partly through the opening 106 in the carrier 50 (A) (see Fig. 7). In rotating the bar 81, the catcher-plate 111 and the disconnector arm were also retracted from the sheaf holding compartment (Fig. 15) and thus a free passage is afforded the carrier 50 (A) past the newly deposited sheaf. The carrier 50 (A) now travels forwardly with the parts positioned as in Figs. 7 and 15. When the carrier reaches the front of the device, the trip 97 again strikes the abutment 24 on spacer 17 (Fig. 17). When the impact occurs, the slide 89 is first moved rearwardly which action pushes on link 103, turns the bar 81 on its pivots and this in turn moves the retracted sheaf arms 104, 105, disconnector 71 and catcher-plate 111 back into the sheaf compartment (see arrow, Fig. 17). The continuation of the movement of the carrier trip 97 against the abutment 24, rotates the trip-shank 96 and turns the contact-plate 119 and detent 114 into their normal positions. This action also jams the sprocket 57 (Fig. 18) against the idler 120 as hereinbefore explained.

The action of the auxiliary disconnector 147 is illustrated in Fig. 9. When one of the carriers 50 makes the initial transit rearwardly with the first sheaf, provision must be made for an abutment against which the disconnector 71 can strike. The vertical spacers 149 act as such. At the time that the sheaf reaches the rear end-gate 135 (side B), the turned-out part 148 of the auxiliary disconnector 147 strikes the abutment 149, and is moved from the dotted line position to that in full lines, which action moves the disconnector 71 (B) and stops that carrier. These auxiliary disconnectors 147 act only at the delivery of the first sheaf on each side. The sheaves then in place act as subsequent abutments against which the disconnectors 71 strike. The nut 69 on the screw 68 may be adjusted at will to regulate the tension of the spring 70. The disconnector 71 will therefore turn with greater or less ease on its pivot and thus accelerate or retard the stopping of the carrier. A shock of from twelve to eighteen sheaves can be formed on each side of the partition 22 (Fig. 1), and when it is completely formed, the operator pulls on the rod 133 (Fig. 26) which opens the bottom and end gates. The shock is thereby set onto the field and stands there.

I claim:—

1. In combination with a binder, a grain shocker comprising a frame, shock holding compartments formed in said frame, reciprocatable sheaf carriers mounted on said frame, a normally active carrier transporting means, one of the aforesaid carriers remaining stationary while the other engages the transporting means, means for rendering said engagement of the last named carrier with the transporting means intermittent, and means on the carriers for automatically effecting engagement with the transporting means at alternate times.

2. In a grain shocker, a central longitudinal partition, shock holding compartments on each side of the central partition, track rails disposed in parallelism with and adjacent to the shock holding compartments, sheaf carriers mounted on the track rails, and automatic means for transporting the carriers along the track rails at alternate times.

3. In a grain shocker, a central longitudinal partition, shock holding compartments on each side of the central partition, track rails disposed in parallelism with and adjacent to the shock holding compartments, sheaf carriers mounted on the track rails and normally positioned at diagonally opposite ends of the shock compartments, and automatic means for transporting the carriers along the track rails at alternate times.

4. In a grain shocker, a central longitudinal partition, shock holding compartments on each side of the central partition, parallel track rails disposed in longitudinal contiguity with the shock holding compartments, a sheaf carrier mounted between the parallel track rails adjacent to each compartment said carriers being normally located at diagonally opposite positions on the track rails, and means for automatically transporting the carriers along the track rails at alternate times.

5. In a grain shocker, a central longitudinal partition, shock holding compartments on each side of the central partition, parallel track rails disposed in longitudinal contiguity with the shock holding compartments, a sheaf carrier mounted between the parallel track rails adjacent to each compartment said carriers being normally located at diagonally opposite positions on the track rails, and adapted to be transported at alternate times, means on the rearwardly located carrier at one side for holding the shock in position, and means for transporting the carriers.

6. In a grain shocker, a central longitudinal partition, shock holding compartments on each side of the central partition, parallel track rails disposed in longitudinal contiguity with the shock holding compartments, a sheaf carrier mounted between the parallel track rails and located at the rear end of and adjacent to the shock holding compartment at one side of the partition, another sheaf carrier mounted between the parallel track rails and located at the front end of and adjacent to the shock holding compartment at the other side of the partition, carrier transporting means situated adjacent to each carrier, and means embodied in the rearwardly located carrier for retaining the shock in position.

7. In a grain shocker, a central longitudinal partition, shock holding compartments on each side of the central partition, parallel track rails disposed in longitudinal contiguity with the shock holding compartments, a sheaf carrier mounted between the parallel track rails and located at the rear end of and adjacent to the shock holding compartment at one side of the partition, another sheaf carrier mounted between the parallel track rails and located at the front end of and adjacent to the shock holding compartment at the other side of the partition, carrier transporting means situated adjacent to each carrier, means embodied in the rearwardly located carrier for retaining the shock in position, and means embodied in the forwardly located carrier connectible to the carrier transporting means when a sheaf is delivered to the carrier.

8. In a grain shocker, a central longitudinal partition, shock holding compartments on each side of the central partition, parallel track rails disposed in longitudinal contiguity with the shock holding compartments, a main shaft mounted at the front of the track rails, an idler shaft mounted at the rear of the track rails, sprockets mounted on each end of the main and idler shafts in proximity to the track rails, each set of sheaf carriers being mounted on the track rails and being normally positioned at diagonally opposite ends of the shock holding compartments, a transporting chain fitted over each set of sprockets and passing in proximity to the carriers, means embodied in each carrier adapted to become connected with the approximate transporting chain at alternate and intermittent times, and means co-acting with the main shaft for imparting movement to the transporting chain.

9. In a grain shocker, a central longitudinal partition, parallel track rails disposed in longitudinal contiguity with the central partition said rails and partition forming the confines of the shock holding compartments, a sheaf carrier normally located at each end of the compartments at opposite sides of the central partition, a constantly moving carrier transporting means adapted to co-act with each carrier, means on the rearmost and stationary carrier for retaining the shock in position, and means on the forward carrier for automatically connecting the carrier with the transporting chain when a sheaf is delivered thereto, to transport said carrier rearward.

10. In a grain shocker, a central longitudinal partition, parallel track rails disposed in longitudinal contiguity with the central partition said rails and partition forming the confines of the shock holding compartments, a sheaf carrier normally located at each end of the compartments at opposite sides of the central partition, a constantly moving carrier transporting means adapted to co-act with each carrier, a means on the rearmost and stationary carrier for retaining the shock in position, and means on the forward carrier for automatically connecting the carrier with the transporting chain when a sheaf is delivered thereto, to transport said carrier rearward, and means on said last named carrier for terminating its rearward transit when the said means engages a previously deposited sheaf.

11. In a grain shocker, a central longitudinal partition, parallel track rails disposed in longitudinal contiguity with the central partition, said rails and partition forming the confines of the shock holding compartments, a sheaf carrier normally located at each end of the compartments at opposite sides of the central partition, a constantly moving carrier transporting means adapted to co-act with each carrier, means on the rearmost and stationary carrier for retaining the shock in position, means on the forward carrier for automatically connecting the carrier with the transporting chain when a sheaf is delivered thereto, to transport said carrier rearward, means on said last named carrier for terminating its rearward transit when the said means engages a previously deposited sheaf, and means on the stationary carrier for automatically connecting said carrier with its co-acting transporting means when engaged by the opposite and just returned carrier, to transport the recently stationary carrier forward.

12. In combination with a binder having a sheaf discharge deck a grain shocker, having a central longitudinal partition, parallel track rails, shock holding compartments formed between the partition and track rails an intermittently movable sheaf carrier mounted on one set of the track rails and positioned in proximity to the sheaf discharge of the binder, a pivoted detent on one of the track rails, a deflector gate hinged to the central partition in proximity to the sheaf discharge of the binder, a pivoted detent mounted on one of the track rails, a deflector gate hinged to the central partition in proximity to the sheaf discharge deck of the binder, link connections between the deflector gate and pivoted detent, and means on the carrier for depressing the detent and shifting the deflector gate to direct the sheaf from the binder into the carrier.

13. In combination with a binder, a grain shocker having a central longitudinal partition, parallel sets of track rails, shock holding compartments formed between the partition and track rails, an intermittently reciprocating sheaf carrier mounted on one set of the track rails and positioned in proximity to the sheaf discharge of the binder, a pivoted detent mounted on one of the track rails, said detent being held in its normal position by a spring, a deflector gate hinged to the central partition in proximity to the binder discharge rod, bell-crank and link connections between the deflector gate and the pivoted detent, and a cam-plate on the carrier for depressing the detent and shifting the deflector to one side to permit the entrance of the discharged sheaf from the binder to the carrier.

14. In combination with a binder having a discharge deck, a grain shocker having a central longitudinal partition, parallel sets of track rails, shock holding compartments formed between the partition and track rails, an intermittently reciprocating sheaf carrier mounted on one set of the track rails and positioned in proximity to the sheaf discharge of the binder, a pivoted detent mounted on one of the track rails, said detent being held in its normal position by a spring, a deflector gate hinged to the central partition in proximity to the binder discharge deck, bell-crank and link connections between the deflector gate and the pivoted detent, and a cam-plate on the carrier for depressing the detent and shifting the deflector to one side to permit the entrance of the discharged sheaf from the binder discharge deck to the carrier, said deflector gate being returned and held in its normal position by the detent spring when the detent is released by the cam-plate.

15. In a grain shocker having a central longitudinal partition and parallel sets of track rails, shock holding compartments formed between the partition and track rails at each side of the partition, an intermittently reciprocating sheaf carrier mounted on the track rails and having a plurality of grooved rollers, said rollers engaging the track rails, a follower secured to the carrier and extending into the shock compartment at one side, a pivoted bar mounted on the carrier, said carrier having a plurality of openings in proximity to the bar, right angled shock holding arms secured to said pivoted bar and extending through certain of the openings in the carrier and into the shock compartment, a right-angled catcher-bar pivotally mounted on said pivoted bar and extending through another of the aforesaid openings in the carrier and into the shock compartment, and a catcher-plate mounted on the said extension of the catcher-bar within the shock compartment, said catcher-plate being adapted to primarily receive the discharged sheaf from the binder.

16. In combination with a binder, a grain shocker having a central partition and parallel sets of track rails, shock holding compartments being formed between the partition and rails, an intermittently transitional sheaf carrier mounted on the tracks and temporarily stationed at the binder discharge, a sheaf-catching device pivoted to the carrier and extending into the sheaf compartment at one side, a constantly moving carrier, transporting means and means automatically connectible to the transporting means when a sheaf engages the catching device, at being discharged from the binder.

17. In combination with a binder, a grain shocker having a central partition and parallel sets of track rails, shock holding compartments being formed between the partition and rails, an intermittently transitional sheaf carrier mounted on the track and temporarily stationed at the binder discharge, a sheaf-catcher pivoted to the carrier and extending into the sheaf compartment, a constantly moving carrier transporting means, a clutch device stationed on the carrier having a normally loose connection with the transporting means, and clutch shifting means connected between the clutch device and the sheaf-catcher adapted to move the clutch into fixed engagement with the transporting means when a sheaf engages the catcher at being discharged from the binder.

18. In a grain shocker, a parallel set of tracks an intermittently transitional sheaf carrier mounted on the tracks and having a plurality of elongated openings, a vertical pivoted bar mounted on the carrier in proximity to the openings, a catcher bar pivoted to the vertical bar and having a sheaf catcher mounted on a right-angled extension thereof the said extension projecting through one of the openings, a constantly moving carrier transporting chain, a sprocket mounted on the carrier and having a normally loose engagement with the chain, a clutch device embodied in the sprocket and connected to the catcher-bar, said clutch device being adapted to effect a fixed engagement of the sprocket with the chain when the sheaf-catcher is depressed.

19. In a grain shocker, a supporting frame including tracks, a sheaf carrier mounted on said tracks and having a plurality of elongated openings, a vertical pivoted bar mounted on the carrier in proximity to the openings, a catcher-bar pivoted to the vertical bar and having a sheaf catcher mounted on a right-angled extension thereof, the said extension projecting through one of the openings, a constantly moving carrier chain, a guide secured to the carrier near the upper edge, a movable slide mounted in said guide, a spindle having a fixed clutch element secured to said slide, a sprocket rotatably mounted on said spindle and having a normally loose engagement with the upper strand of the chain, said sprocket embodying a movable co-acting clutch element, a shifting-in lever pivoted above the sprocket and engaging therewith, a link connection between the shifting-in lever and the catcher-bar, said shifting-in lever being adapted to move the clutch elements into fixed engagement when the sheaf-catcher is depressed so as to transport the carrier rearwardly.

20. In a grain shocker, a supporting frame including tracks, a sheaf carrier mounted on said tracks and having a plurality of elongated openings, a vertical pivoted bar mounted on the carrier in proximity to the openings, a catcher-bar pivoted to the vertical bar and having a sheaf-catcher mounted on a right-angled extension thereof, the said extension projecting through one of the openings, a constantly moving carrier chain, a guide secured to the carrier near the upper edge, a movable slide mounted in said guide, a spindle having a fixed clutch element secured to said slide, a sprocket rotatably mounted on said spindle and having a normally loose engagement with the upper strand of the chain, said sprocket embodying a movable co-acting clutch element, a shifting-in lever pivoted above the sprocket and having a right-angled extension, the said lever engaging the sprocket, a right-angled link connection pivotally secured to the catcher-bar one end of the link connection passing through an aperture in the extension of the shifting-in lever, a coil-spring interposed between the last named extension and the link connection, the aforesaid shifting-in lever being adapted to move the clutch elements into fixed engagement when the sheaf-catcher is depressed so as to transport the carrier rearwardly.

21. In a grain shocker, a supporting frame including tracks and shock compartments, a sheaf carrier mounted on said tracks and having a plurality of elongated openings, a vertical pivoted bar mounted on the carrier in proximity to the openings, a constantly moving carrier chain, a guide secured to the carrier near the upper edge, a movable slide mounted in said guide, a spindle having a fixed clutch element secured to said slide, a sprocket having an integral rearwardly extending grooved collar rotatably mounted on the spindle, a movable clutch element formed by a forwardly extending portion of the sprocket collar, said element being adapted to engage the aforesaid fixed clutch element, a shifting-out lever pivoted at one side of the sprocket and having bifurcations engaging the groove in the sprocket collar, said lever having a right-angled extension, a supporting bracket secured to the aforesaid vertical bar, a disconnector pivoted on the bracket one end thereof projecting through another of the aforesaid elongated openings, a spring connection located between the other end of the disconnector and the extension of the shifting-out lever, said shifting-out lever being adapted to move the clutch elements out of fixed engagement when the disconnector strikes a previously deposited sheaf in the shock compartment to terminate the rearward transit of the carrier.

22. In a grain shocker, a supporting frame including tracks and a shock compartment, a sheaf carrier mounted on said tracks and having a plurality of elongated openings, a vertical pivoted bar mounted on the carrier in proximity to the openings, a constantly moving carrier chain, a guide secured to the carrier near the upper edge, a movable slide mounted in said guide, a spindle having a fixed clutch element secured to said slide, a sprocket having an integral rearwardly extending grooved collar rotatably mounted on the spindle, a movable clutch element formed by a forwardly extending portion of the sprocket collar said element being adapted to engage the aforesaid fixed clutch element, a shifting-out lever pivoted at one side of the sprocket and having bifurcations engaging the groove in the sprocket collar said lever having a right-angled extension, a supporting bracket secured to the aforesaid vertical bar, a disconnector pivoted on the bracket one end thereof projecting through another of the aforesaid elongated openings, a spring connection located between the other end of the disconnector and the extension of the shifting-out lever, a screw shank located in the right-angled extension of the shifting-out lever and connected to the aforesaid spring connection, and a tension adjusting nut applied to the other end of the screw and abutting the right-angled extension.

23. In a grain shocker, a supporting frame including tracks and shock compartments, a sheaf carrier mounted on said tracks and having a plurality of elongated openings, a vertical pivoted bar mounted on the carrier in proximity to the openings, a catcher plate pivoted to the vertical bar, right-angled shock holding arms secured to the vertical bar and extending through certain ones of the aforesaid openings and into the shock compartment, a constantly moving carrier chain, a guide secured to the carrier near the upper edge, a movable slide mounted in said guide, a spindle having a fixed clutch element secured to said slide, a sprocket having an integral rearwardly extending grooved collar rotatably mounted on the spindle, a movable clutch element formed in an integral forwardly extending portion of the sprocket collar said element being adapted to engage the aforesaid fixed clutch element, a shifting-out lever pivoted at one side of the sprocket and having bifurcations engaging the groove in the sprocket collar, said lever having a right-angled extension, a supporting bracket secured to the aforesaid vertical bar, a disconnector pivoted on the bracket one end thereof projecting through another of the aforesaid elongated openings, a spring connection located between the other end of the disconnector and the extension of the shifting-out lever, guides secured to the carrier at the upper and lower edges thereof, slides movably mounted in said guides, spindles secured to said slides, sprockets mounted on the spindles on the upper and lower slides, said sprockets engaging the upper and lower strands of the chain, relatively fixed idlers adjacent to the aforesaid sprockets, said idlers being also engaged by the chain, a link connecting the lower slide with one of the shock-holding arms, a follower secured to the carrier within the shock compartment and in opposition to the shock-holding arms, said follower and arms being adapted to receive and convey the sheaf rearwardly to the shock.

24. In a grain shocker, a supporting frame including tracks and shock compartments, a sheaf carrier mounted on said tracks and having a plurality of elongated openings, a vertical pivoted bar mounted on the carrier in proximity to the openings, a constantly moving carrier chain, a guide secured to the carrier near the upper edge, a movable slide mounted in said guide, a spindle having a fixed clutch element secured to said slide, a sprocket having a rearwardly extending grooved collar rotatably mounted on the spindle, a movable clutch element formed by a forwardly extending portion of the sprocket collar said element being adapted to engage the aforesaid fixed clutch element, a shifting-out lever pivoted at one side of the sprocket and having bifurcations engaging the groove in the sprocket collar said lever having a right-angled extension, a supporting bracket secured to the aforesaid vertical bar, a disconnector pivoted on the bracket one end thereof projecting through another of the aforesaid elongated openings, a spring connection located between the other end of the disconnector and the extension of the shifting-out lever, a guide secured to the carrier near the lower edge, a movable slide mounted in said guide, a spindle having a fixed clutch element secured to said slide, a sprocket rotatably mounted on the spindle, and having a normally loose engagement with the lower strand of the chain said sprocket embodying a movable co-acting clutch element, a shifting-out lever pivoted at one side of the sprocket and having sprocket-engaging bifurcations, means embodied in said lever for holding the shifting-out lever to its adjustments and a spring interposed between the slide and sprocket for holding the sprocket against the aforesaid lever.

25. In a grain shocker, a supporting frame including parallel tracks and shock compartments, spacers interposed between the tracks, an abutment formed on one of the said spacers at the front of the shocker, a sheaf carrier mounted on said tracks, a constantly moving carrier chain, a guide secured to the carrier near the lower edge, a movable slide mounted in said guide, a spindle having a fixed clutch element secured to said slide, a sprocket rotatably mounted on the spindle, and having a normally loose engagement with the lower strand of the chain said sprocket embodying a movable co-acting clutch element, a trip-shank pivoted on the aforesaid slide, a shifting-out lever secured to the trip-shank at its bearing on the slide said lever having sprocket engaging bifurcations, means for holding the shifting-out lever to its adjustments, a spring adapted to press the sprocket against the shifting-out lever and a trip on the trip-shank adapted to engage the spacer-abutment to cause the throw-out lever to disengage the clutch elements when the carrier terminates its forward transit.

26. In a grain shocker, a supporting frame including parallel tracks and shock compartments, spacers interposed between the tracks, an abutment formed on one of the said spacers at the front of the shocker, a sheaf carrier mounted on said tracks, a constantly moving carrier chain, a guide secured to the carrier near the lower edge, a movable slide mounted in said guide, a trip-shank pivoted on the slide, said trip-shank extending vertically and having a right-angled bend, said bend extending across the adjacent shock compartment, a contact plate mounted on said end, a follower secured to the carrier within the shock compartment, an extensible and retractible detent pivoted to the follower and engaged by the contact-plate, said detent extending across to the contiguous shock compartment, a trip on the trip-shank adapted to engage the spacer abutment when the carrier terminates its forward transit, and a spring-latch device interposed between the trip and trip-shank to hold the detent to its extended or retracted positions.

27. In a grain shocker, a supporting frame including parallel tracks and shock compartments, spacers interposed between the tracks, an abutment formed on one of the said spacers at the front of the shocker, a sheaf carrier mounted on said tracks, a constantly moving carrier chain, a guide secured to the carrier near the lower edge, a movable slide mounted in said guide, a bearing on one end of the slide, said bearing having notches, a trip-shank mounted in the bearing, a pivoted bar mounted on the aforesaid carrier, said carrier having openings adjacent to the bar, retractible shock holding arms secured to said bar and projecting through said openings into the shock compartment, a link connecting one of the arms with the aforesaid slide, a lever secured to the lower end of the trip-shank and a spring-latch mounted on said lever adapted to engage one of the aforesaid notches when the aforementioned trip engages the spacer abutment to project the retracted shock holding arms into the shock compartment.

28. In a grain shocker, a supporting frame including parallel tracks and shock compartments, a sheaf carrier mounted on said tracks, a constantly moving carrier chain, a guide secured to the carrier near the lower edge, a movable slide mounted in said guide, a bearing on one end of the slide, said bearing having notches, a trip-shank mounted in the bearing, a pivoted bar mounted on the aforesaid carrier, said carrier having openings adjacent to the bar, retractible shock holding arms secured to said bar and projecting through said openings into the shock compartment, a link connecting one of the arms with the aforesaid slide, a lever secured to the lower end of the trip-shank, and a spring-latch mounted on said lever adapted to engage another of the aforesaid notches to the shock-holding arms in a retracted position.

29. In a grain shocker, a supporting frame including parallel tracks and shock compartments, spacers interposed between the tracks, an abutment formed on one of the said spacers at the front of the shocker, a sheaf carrier mounted on said tracks, a constantly moving carrier chain, a guide secured to the carrier near the lower edge, a movable slide mounted in said guide, a spindle having a fixed clutch element secured to said slide, a sprocket rotatably mounted on the spindle, and having a normally loose engagement with the lower strand of the chain, said sprocket embodying a movable co-acting clutch element, a shifting-out lever pivoted at one side of the sprocket and having sprocket engaging bifurcations, means embodied in said lever for holding the shifting-out lever to its adjustments and a spring interposed between the slide and sprocket for holding the sprocket against the aforesaid lever, a bearing on one end of the slide, said bearing having notches, a trip-shank mounted in the bearing, a lever secured to the lower end of the trip-shank, a shifting-out lever connected to the aforesaid trip-shank secured lever, the aforesaid sprocket being engaged by the bifurcated end of the shifting-out lever, and a spring latch mounted on the trip-shank secured lever adapted to engage one of the bearing notches when the aforementioned trip engages the spacer abutment to disengage the sprocket clutch elements.

30. In a grain shocker, a central partition and contiguous supporting track rails, shock compartments being formed between the former and latter, said compartments adapted to contain sheaves, carrier and transporting chains, a temporarily stationary carrier mounted on the tracks adjacent one compartment, a temporarily transitional carrier mounted on the tracks adjacent the other compartment, a detent on the transitional carrier and extending across the central partition into the adjoining compartment, a trip-shank on the stationary carrier projecting into the path of the aforesaid detent, a slide mounted on the lower edge of the stationary carrier, a spindle having a fixed clutch element secured to said slide, a shiftable sprocket on said spindle having a co-acting clutch element, said sprocket having free connections with the adjacent carrier chain, a bearing on one end of the slide, said bearing having notches, the aforesaid trip-shank being mounted in said bearing, a sprocket shifting lever secured to the trip-shank, said lever engaging the sprocket, and a spring-latch mounted on the shifting lever adapted to engage another of the aforesaid bearing notches to hold the shifting-lever out and permit the movable sprocket-clutch element to engage the fixed clutch element to establish a fixed connection between the sprocket and adjacent chain when the trip on the stationary carrier is engaged by the detent on the transitional carrier.

31. In a grain shocker, a central longitudinal partition, parallel track rails, shock holding compartments formed between the partition and track rails, a sheaf carrier mounted on the track rails at diagonally opposite ends of the compartments, a carrier transporting chain co-acting with each carrier, one of said carriers being stationary and holding the shock in position while the other carrier is transitional, means on the stationary carrier for retracting the sheaf holding devices when engaged by the just returned carrier and prior to the forward transit of first-named carrier.

32. In a grain shocker parallel track rails, a carrier mounted between said rails, a constantly moving carrier transporting chain, said chain having two strands traveling in opposite directions and in proximity to the carrier, relatively fixed idlers engaging each strand of the chain, relatively movable slides mounted on the carrier, sprockets co-acting with the idlers mounted on the slides, said sprockets having free engagement with the chain when the carrier is stationary, sheaf-holding arms pivotally mounted on the carrier and having articulate connection with the slides, said arms being adapted to move the lower and upper sprockets into alternate jammed and free relationship with the lower and upper idlers respectively when the carrier terminates its rearward transit.

33. In a grain shocker, parallel track rails, a carrier mounted between said rails, a constantly moving carrier chain having upper and lower strands traveling in rearward and forward directions and in proximity to the carrier, relatively fixed idlers engaging each strand of the chain, relatively movable slides mounted on the carrier, sprockets co-acting with the idlers mounted on the slides, said sprockets having free engagement with the chain when the carrier is stationary, sheaf-holding arms pivotally mounted on the carrier and having articulate connection with the slides, said arms being adapted to move the lower and upper sprockets into alternate jammed and free relationship with the lower and upper idlers respectively when the carrier terminates its rearward transit and means embodied in the carrier mechanism for simultaneously retracting the sheaf-holding arms from engagement with a sheaf and moving the lower sprocket from jammed relationship with its co-acting idler when fixed engagement is established of the lower sprocket with the forwardly moving strand of the chain.

34. In a grain shocker, a shock compartment, parallel track rails, a carrier mounted between said rails, a constantly moving carrier chain having upper and lower strands traveling in rearward and forward directions and in proximity to the carrier, relatively fixed idlers engaging each strand of the chain, relatively movable slides mounted on the carrier, sprockets co-acting with the idlers mounted on the slides, said sprockets having free engagement with the chain when the carrier is stationary, a vertical bar pivoted on the carrier, a sheaf-catcher pivoted to the bar, a disconnector secured to said bar and sheaf-holding arms secured to the bar and having articulate connections with the aforesaid slides, said catcher, disconnector and arms projecting into the shock compartment, and means embodied in the carrier mechanism for simultaneously retracting the catcher, disconnector and sheaf-holding arms from the shock-compartment when fixed engagement is established of the lower sprocket with the forwardly moving strand of the chain.

35. In a grain shocker, a central partition and track rails, a shock compartment formed between the central partition and the track rails, a carrier mounted on the rails, a follower secured to the carrier and situated in the shock compartment, a detent pivoted to the follower and extending across the ridge of the central partition, a trip-shank mounted on the carrier and having a contact plate, said plate engaging the detent, a spring connected between the rear end of the detent and follower to normally hold the detent extended, and means coöperating with the trip-shank to retain the detent in a retracted position against the tension of its spring, at times.

36. In a grain shocker, parallel track rails having vertical spacers, a spacer abutment at the rear of the rails, and movable toward the spacer abutment in one direction, a sheaf-carrier reciprocatably mounted on the rails, a constantly moving carrier chain, said chain having a forward and rearwardly moving strand in proximity to the carrier, a sprocket engaging the rearwardly moving strand means embodied in said sprocket for establishing a fixed and free connection with the chain, a primary disconnector coöperating with the aforesaid sprocket, a guide secured to the carrier at the rear end, an auxiliary disconnector mounted in said guide said auxiliary disconnector extending into proximity to the primary disconnector, said primary disconnector being operable when the auxiliary disconnector engages the spacer abutment.

37. In a grain shocker, parallel track rails having vertical spacers, a spacer abutment at the rear of the rails, a sheaf-carrier mounted on the rails movable toward the spacer abutment in one direction, a constantly moving carrier chain, said chain having a forward and rearwardly moving strand in proximity to the carrier, a sprocket engaging the rearwardly moving strand, means embodied in said sprocket for establishing a fixed and free connection with the chain, a primary disconnector coöperating with the aforesaid sprocket, a guide secured to the carrier at the rear end, an auxiliary disconnector mounted in said guide said auxiliary disconnector extending into proximity to the primary disconnector, said primary disconnector being operable by the auxiliary disconnector when the carrier makes its initial rearward transit.

38. In a grain shocker, shock-holding compartments formed by a central fixed partition, bottom gates hinged to the bottom edges of the said fixed partition, parallel track rails arranged in longitudinal contiguity with the central partition and adjacent the bottom gates, end gates hinged to the central partition at each side thereof, and means for simultaneously moving the bottom and end gates to dump the shock.

39. In a grain shocker, a central upwardly converging partition having a closure at the base, bottom gates hinged to the base of the partition at each side, inwardly inclined end gates hinged to the rear end of the partition and at each side, thereof, spaced guides secured to the bottom closure of the partition, a slide movably mounted between the guides, bridge plates spanning the slide space and adapted to retain the slide, links joining the slide with the bottom gates at each side, a bell crank mounted in proximity to the rear end gates, links joining the end gates with one arm of the bell-crank, another link connecting the other arm of the bell-crank with the aforesaid slide, and a means connected to the slide for moving the same longitudinally.

40. In a grain shocker, a central upwardly converging partition, bottom gates hinged to the base of the partition and at either side thereof, inwardly inclined end gates hinged to the rear of the partition and at each side thereof, and link devices connected to the bottom and end gates for moving them simultaneously.

JACOB P. HIEBERT.